United States Patent [19]

Matsuno et al.

[11] Patent Number: 4,474,391
[45] Date of Patent: Oct. 2, 1984

[54] INSTRUMENT PANEL FOR AUTOMOTIVE VEHICLES

[75] Inventors: Yoshio Matsuno; Tokuichiro Hosaka, both of Yokohama, Japan

[73] Assignee: Nissan Motor Co., Ltd., Yokohama, Japan

[21] Appl. No.: 284,558

[22] Filed: Jul. 20, 1981

[30] Foreign Application Priority Data

Aug. 12, 1980 [JP] Japan .................................. 55-111381

[51] Int. Cl.³ .............................................. B60R 21/02
[52] U.S. Cl. ..................................... 280/752; 180/90; 296/70; 296/189
[58] Field of Search .................. 280/752, 751; 180/90; 296/70, 189

[56] References Cited

U.S. PATENT DOCUMENTS

| | | | |
|---|---|---|---|
| 3,876,228 | 4/1975 | Hawkins | 280/752 |
| 3,924,707 | 12/1975 | Renner | 280/752 |
| 3,930,665 | 1/1976 | Ikawa | 280/752 |
| 4,105,223 | 8/1978 | Oda et al. | 280/752 |
| 4,123,085 | 10/1978 | Oda et al. | 280/752 |

FOREIGN PATENT DOCUMENTS

| | | |
|---|---|---|
| 1214558 | 2/1964 | Fed. Rep. of Germany . |
| 1505685 | 11/1970 | Fed. Rep. of Germany ...... 280/751 |
| 2238676 | 2/1974 | Fed. Rep. of Germany ...... 296/189 |
| 2524825 | 6/1975 | Fed. Rep. of Germany . |
| 1160879 | 8/1969 | United Kingdom ................ 280/752 |

Primary Examiner—David M. Mitchell
Assistant Examiner—Joseph G. McCarthy
Attorney, Agent, or Firm—Thompson, Birch, Gauthier & Samuels

[57] ABSTRACT

In accordance with the present invention, there is provided an improved instrument panel for an automotive vehicle which comprises a one-piece, elongated sheet material structure adapted to extend between front pillars of the vehicle. The sheet material structure has a panel portion which forms a passenger's head impinging zone.

According to the present invention, the sheet material structure is further provided with a weakened panel portion at a location other than the panel portion forming the passenger's head impinging zone. The weakened panel portion is adapted to promote the absorption and dissipation of impact energy by weakened part of the sheet material structure permitting controlled deformation and breakage.

12 Claims, 16 Drawing Figures

FIG.6 FIG.7 FIG.8
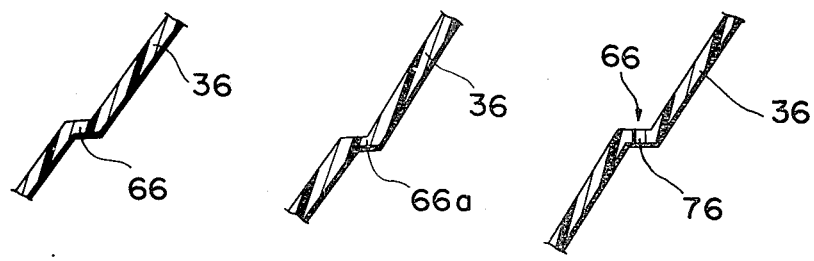
FIG.9 FIG.10
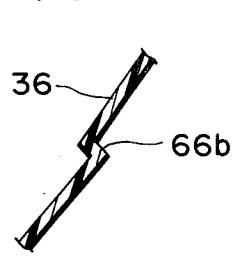
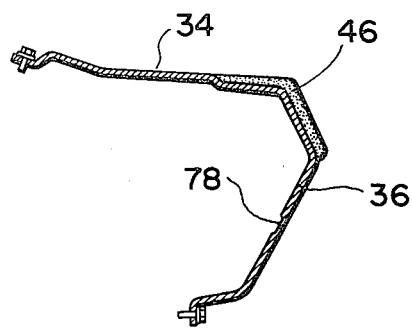
FIG.11
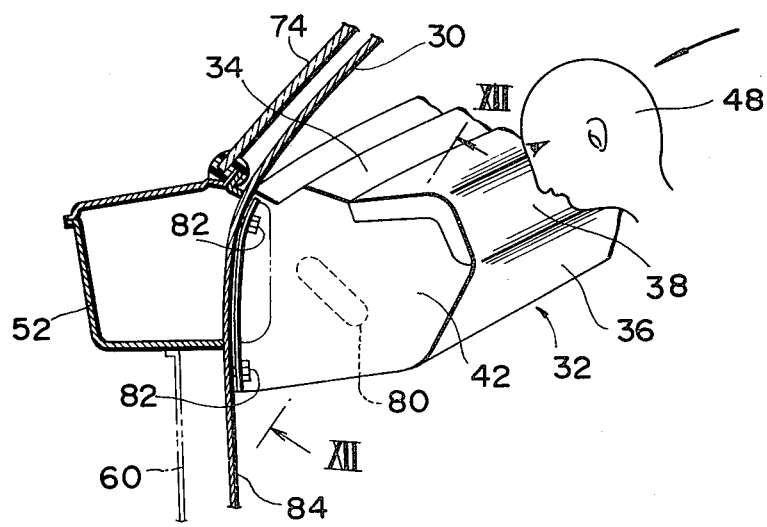

INSTRUMENT PANEL FOR AUTOMOTIVE VEHICLES

BACKGROUND OF THE INVENTION

1. Field of the Invention

The present invention relates in general to instrument panels for automotive vehicles and more particularly to an energy absorbing structure of an instrument panel.

2. Description of the Prior Art

In FIGS. 1 to 3, a prior art instrument panel for an automotive vehicle is shown by way of example. The instrument panel 10 is disposed between front pillars 12 of the vehicle and formed from integral panel sections including side panel sections 14 located adjacent the front pillars 12, upper and lower spaced panel sections 16 and 18, and a rear end panel section 20 connecting the upper and lower panel sections at the rear ends thereof. The upper and lower panel sections 16 and 18 and the rear end panel section 20 form a substantially C-shaped section. A panel portion 22 extending from the rear part of the upper panel section 16 to the upper part of the rear end panel section 20 is covered by a padding layer 24 and adapted to form a passenger's head impinging zone. The panel portion 22 is formed with a plurality of slits 26 to promote the absorption and dissipation of impact energy by weakening the panel's resistance to deformation and breakage.

The foregoing prior art instrument panel is disadvantageous since dangerous sharp-edged folds and fragments are prone to be caused during a collision. That is, in the prior art instrument panel, the slits 26 are provided in the panel portion 22 which forms tthe passenger's head impinging zone. During the first stage of a collision condition, the torso of the passenger is thrown forwardly under sudden stop conditions and the head of the passenger impinges against the panel portion 22, applying an impact energy to the instrument panel 10. During the second stage of the collision condition, the instrument panel 10 is caused to deform, absorbing the impact energy. In this instance, the slits 26 are prone to cause sharp-edged folds and fragments which can easily reach the passenger's head to injure it. The slits arranged as such are therefore quite dangerous. The prior art instrument panel is further disadvantageous since it tends to lack the stiffness necessary for use under normal conditions due to the slits having such locations.

SUMMARY OF THE INVENTION

In accordance with the invention, there is provided an improved instrument panel for an automotive vehicle which comprises a one-piece, elongated sheet material structure adapted to extend between the front pillars of the vehicle. The sheet material structure has a panel portion which forms a passenger's head impinging zone. According to the present invention, the sheet material structure is further provided with a weakened panel portion at a location other than the panel portion forming the passenger's head impinging zone. The weakened panel portion is adapted to promote the absorption and dissipation of impact energy by weakening part of the sheet material structure permitting controlled deformation and breakage.

With the above structure, the deformation of dangeous sharp-edged folds and fragments which can reach the passenger's head, can be prevented and thereby serious damages or injuries to the passenger's head during the second stage of the collision condition can be prevented. Further, the above structure enables the instrument panel to retain the stiffness necessary for use under normal conditions without reducing its energy absorbing characteristics.

It is accordingly an object of the present invention to provide an improved instrument panel for an automotive vehicle which does not cause dangerous sharp-edged folds and fragments during a collision and which can avoid injuries to the passenger's head during the second stage of a collision condition with certainty.

It is another object of the present invention to provide an improved instrument panel of the foregoing character which can retain the stiffness necessary for use under normal conditions without reducing its energy absorbing characteristics.

BRIEF DESCRIPTION OF THE DRAWINGS

The features and advantages of the instrument panel according to the present invention will become more clearly appreciated from the following description taken in conjunction with the accompanying drawings, in which:

FIG. 6 is a fragmentary view showing the portion VI of FIG. 5 on an enlarged scale;

FIGS. 7 to 9 are views similar to FIG. 6 but showing second to fourth embodiments of the present invention;

FIG. 10 is a cross-sectional view, similar to FIG. 5 showing a fifth embodiment of the present invention, with some parts however being omitted;

FIG. 11 is a perspective view taken in the direction of the arrow XI of FIG. 4 and showing a sixth embodiment of the present invention;

DESCRIPTION OF THE PREFERRED EMBODIMENTS

Figure 1:
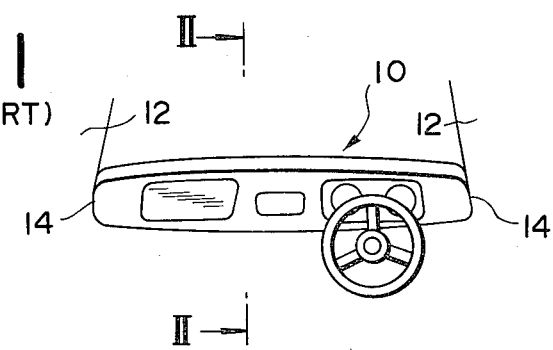
FIG. 1 is an elevational view of a prior art instrument panel for an automotive vehicle.
Figure 2:
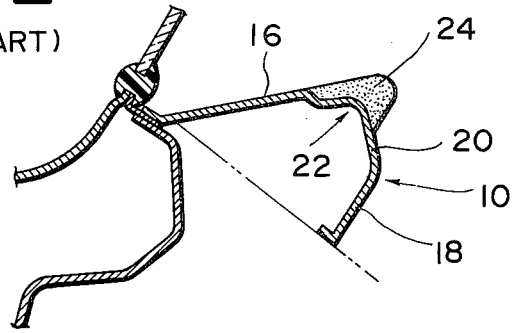
FIG. 2 is a cross-sectional view taken along line II—II of FIG. 1.
Figure 3:
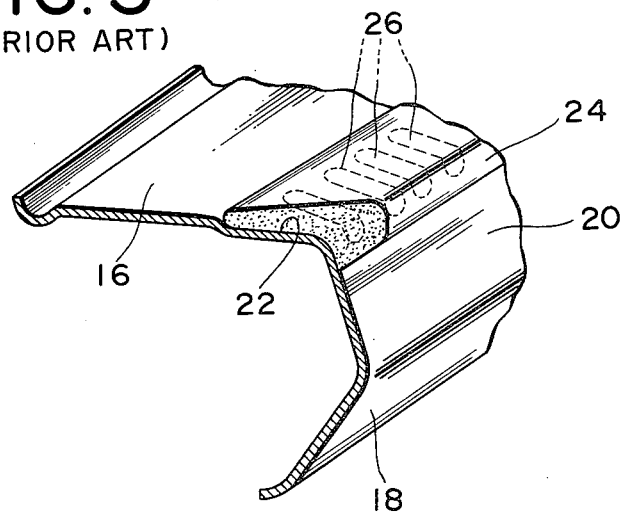
FIG. 3 is a fragmentary perspective view of a portion of the instrument panel of FIG. 1.
Figure 4:
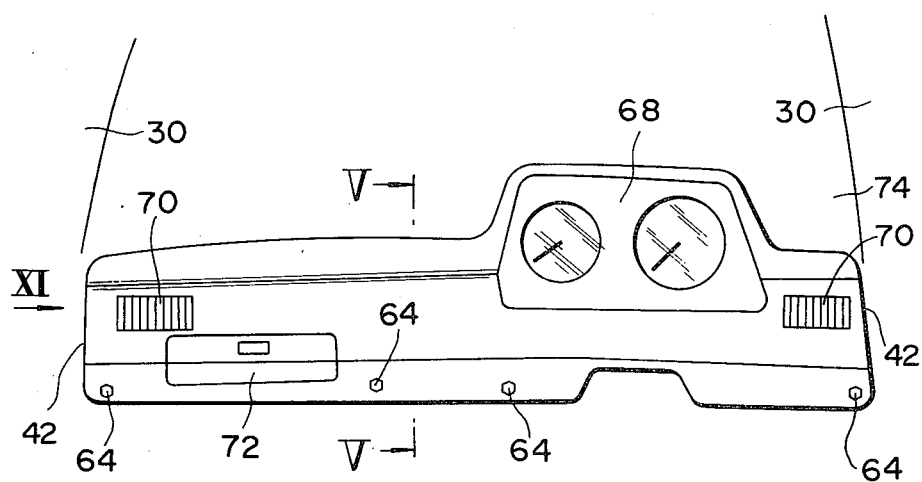
FIG. 4 is an elevational view of an instrument panel for an automotive vehicle showing a first embodiment of the present invention.
Figure 5:
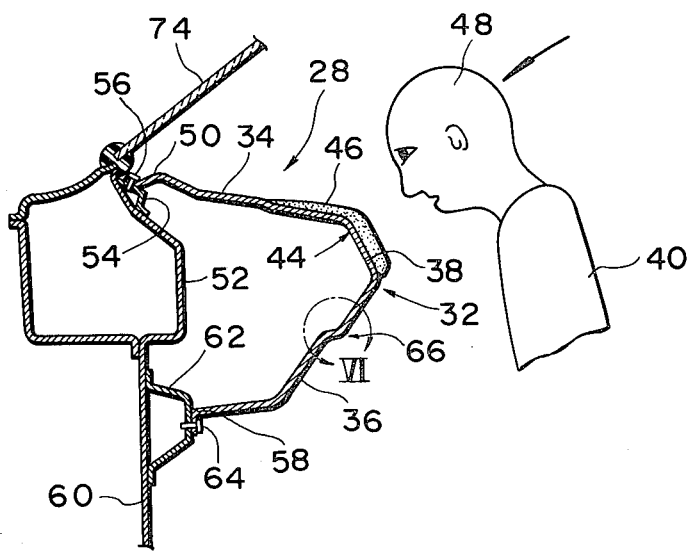
FIG. 5 is a cross-sectional view taken along the line V—V of FIG. 4.

Referring first to FIGS. 4 and 5, the instrument panel 28 of the present invention comprises a one-piece, elongated sheet material structure 32 made of synthetic resin, paper, steel plate, or the like and adapted to extend between front pillars 30 of the vehicle. The sheet material structure 32 includes upper and lower spaced panel sections 34 and 36, a rear end panel section 38 connecting the upper and lower panel sections at the rear end adjacent a vehicle seating area as defined by a passenger 40, and a pair of side panel sections 42 located adjacent the front pillars 30. A panel portion 44 extends between the rear part of the upper panel section 34 and the upper part of the rear end panel section 38. The panel portion 44 is covered by a padding layer 46 and adapted to form on impact or impinging zone for a passenger's head 48. The front end 50 of the upper panel section 34 is secured to a dash upper panel 52 by means of a bracket 54 and a bolt 56. The front end 58 of the lower panel section 36 is secured to a dash lower panel 60 by means of a bracket 62 and a bolt 64.

The sheet material structure 32 is provided with a weakened panel portion at a location other than the panel portion 44 which forms the passenger's head impinging zone. In this embodiment, the weakened panel portion comprises a stepped panel portion 66 which is provided in the lower panel section 36. The stepped panel portion 66 is adapted to promote the absorption and dissipation of impact energy by weakening the lower panel section 36 permitting controlled deformation and breakage. The detail of the stepped panel portion 66 is shown in FIG. 6.

In FIG. 4, the compartment 68 houses two instruments and is covered by a padding layer 46. Two air vents 70 are provided on the sides of the panel 28, a glove compartment 72 is provided in lower panel section 36, and a windshield 74 is mounted above panel 28.

The operation is now described.

During collision, particularly during the first stage, the torso of the passenger 40 is thrown forwardly due to sudden stop conditions. The head 48 of the passenger 40 is thus caused to impinge against the panel portion 44 and apply impact energy to the sheet material structure 32. When the sheet material structure 32 is impinged by the head 48 of the passenger 40 as above, the stepped panel portion 66 of the lower panel section 36 is subjected to a considerably large compression force or forces. During the second stage of the collision, the stepped panel portion 66 which is formed to serve as the weakened panel portion is caused to deform permanently or break, absorbing and dissipating the impact energy and thereby minimizing injuries or damages to the head 48 of the passenger 40. In this instance, dangerous sharp-edged folds and fragments are not produced at the head impact zone 44, thus preventing injuries to the head 48 of the passenger 40 during the second stage of the collision.

FIG. 7 shows the second embodiment of the present invention. This embodiment is substantially similar to the first embodiment of FIG. 5 except that the stepped panel portion 66a is formed thinner than the remaining part of the lower panel section 36 to further promote the absorption and dissipation of impact energy.

FIG. 8 shows the third embodiment of the present invention. This embodiment is substantially similar to the first embodiment of FIG. 5 except that the stepped panel portion 66 is provided with a plurality of slits 76 which are arranged along a transverse line at suitable spaces to further promote the absorption and dissipation of impact energy.

FIG. 9 shows the fourth embodiment of the present invention. This embodiment is substantially similar to the first embodiment of FIG. 5 except that a stepped panel portion 66b is stepped in the reverse direction with respect to the stepped panel portion 66 of FIG. 5 or 6. This embodiment can produce substantially the same effect as the first embodiment of FIG. 5.

FIG. 10 shows the fifth embodiment of the present invention. In this embodiment, the weakened panel portion is formed to comprise a thin-walled panel portion 78 which is thinner than the remaining part of the lower panel section 36 and which has an exterior surface substantially flush with the exterior surface of the remaining part of the lower panel section. With the thin-walled panel portion 78, the fifth embodiment can produce substantially the same effect as the first embodiment of FIG. 5.

Figure 12:
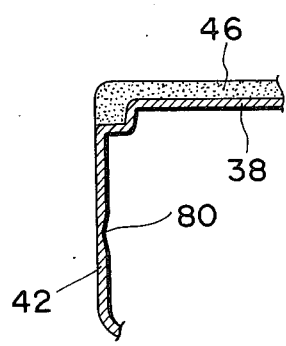
FIG. 12 is an enlarged sectional view taken along line XII—XII of FIG. 11.

FIGS. 11 and 12 show the sixth embodiment of the present invention. In this embodiment, each side panel section 42 is formed with a thin-walled panel portion 80 which is thinner than the remaining part of the side panel section 42 and adapted to effectively promote the absorption and dissipation of impact energy. The thin-walled panel portion 80 has an exterior surface substantially flush with the exterior surface of the remaining part of the side panel section 42. Reference numeral 82 indicates bolts securing the side panel section 2 to the front pillar 30 and to a side panel 84. This embodiment can produce substantially the same effect as the first embodiment of FIG. 5.

Figure 13:
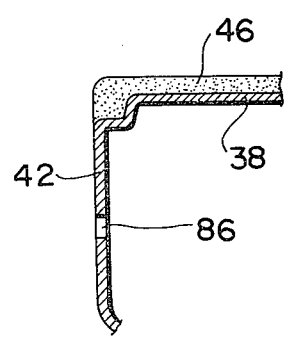
FIGS. 13 to 16 are views similar to FIG. 12 but showing seventh to tenth embodiments of the present invention.

FIG. 13 shows the seventh embodiment of the present invention. In this embodiment, the weakened panel portion is formed to comprise a slit 86 which is provided to the side panel section 42 at a suitable location thereof to promote the absorption and dissipation of impact energy. This embodiment can produce substantially the same effect as the first embodiment of FIG. 5.

Figure 14:
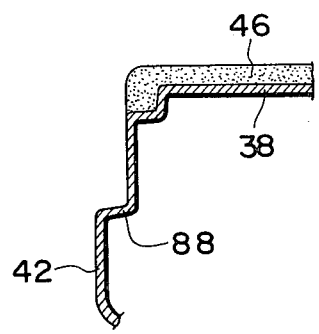

FIG. 14 shows the eighth embodiment of the present invention. In this embodiment, the weakened panel portion is formed to comprise a stepped panel portion 88 which is provided to the side panel section 42 and adapted to promote the absorption and dissipation of impact energy. This embodiment can produce substantially the same effect as the first embodiment of FIG. 5.

Figure 15:
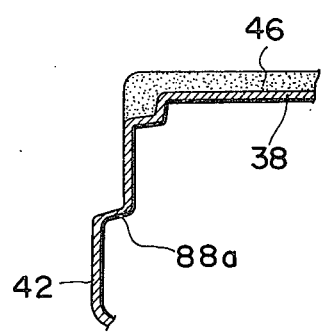

FIG. 15 shows the ninth embodiment of the present invention. This embodiment is substantially similar to the eighth embodiment of FIG. 14 except that a stepped panel portion 88a is formed to be thinner than the remaining part of the side panel section 42 to further promote the absorption and dissipation of impact energy.

Figure 16:
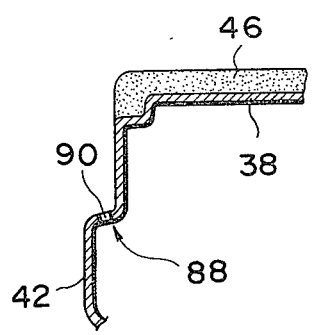

FIG. 16 shows the tenth embodiment of the present invention. This embodiment is substantially similar to the eighth embodiment of FIG. 14 except that the stepped panel portion 88 is formed with a slit 90 to further promote the absorption and dissipation of impact energy.

Obviously, many variations and modifications of the present invention are possible in light of the above teachings. It is, therefore, to be understood that within the scope of the appended claims, the invention may be practiced otherwise than as specifically described.

What is claimed is:

1. An instrument panel for an automotive vehicle, comprising a one-piece, elongated sheet material structure adapted to extend between the front pillars of the vehicle and having a panel portion forming a passenger's head impinging zone, said sheet material structure including upper and lower spaced panel sections, a rear end panel section connecting said upper and lower panel sections at the rear end adjacent a vehicle seating area, said rear end panel section being essentially planar and angularly offset from said upper and lower panel sections, and a pair of side panel sections located adjacent the front pillars, said lower spaced panel sections extending downwardly and forwardly from the lower edge of the rear end panel section, said panel portion forming the head impinging zone being provided in said upper panel section, wherein said sheet material structure is provided with a weakened panel portion at a location other than said panel portion forming the passenger's head impinging zone, said weakened panel portion being adapted to promote the absorption and dissipation of impact energy by weakening part of said sheet material structure permitting controlled deformation and breakage, and wherein said weakened panel portion is provided in said lower panel section.

2. An instrument panel as set forth in claim 1, wherein said weakened panel portion comprises a stepped panel portion.

3. An instrument panel as set forth in claim 2, wherein said stepped panel portion is formed to be thinner than the remaining part of said lower panel section.

4. An instrument panel as set forth in claim 2, wherein said stepped panel portion is formed with a plurality of slits which are arranged along a transverse line at suitable spacing.

5. An instrument panel as set forth in claim 2, wherein said weakened panel portion comprises a thin-wallled panel portion which is thinner than the remaining part of said lower panel section and which has an exterior surface substantially flush with that of the remaining part of said rear panel section.

6. An instrument panel for an automotive vehicle, comprising a one-piece, elongated sheet material structure adapted to extend between the front pillars of the vehicle and having a panel portion forming a passenger's head impinging zone, said sheet material structure including upper and lower spaced panel sections, a rear end panel section connecting said upper and lower panel sections at the rear end adjacent a vehicle seating area, said rear end panel section being essentially planar and angularly offset from said upper and lower panel sections, and a pair of side panel sections located adjacent the front pillars, said lower panel section extending downwardly and forwardly from the lower edge of said rear end panel section, said panel portion forming the head impinging zone being provided in said upper panel section, wherein said sheet material structure is provided with a weakened panel portion at a location other than said panel portion forming the passenger's head impinging zone, said weakened panel portion being adapted to promote the absorption and dissipation of impact energy by weakening part of said sheet material structure permitting controlled deformation and breakage, and wherein said weakened panel portion is provided in at least one of said side panel sections.

7. An instrument panel as set forth in claims 1 or 6, wherein said panel portion forming the head impinging zone is further provided to said rear end panel section.

8. An instrument panel as set forth in claim 6 wherein said weakened panel portion comprises a thin-walled panel portion which is thinner than the remaining part of said side panel section and which has an exterior surface substantially flush with that of the remaining part of the said side panel section.

9. An instrument panel as set forth in claim 6, wherein said weakened panel portion comprises a slit.

10. An instrument panel as set forth in claim 6, wherein said weakened panel portion comprises a stepped panel portion.

11. An instrument panel as set forth in claim 10, wherein said stepped panel portion is formed with a slit.

12. An instrument panel as set forth in claim 10, wherein said stepped panel portion is formed to be thinner than the remaining part of said side panel section.

* * * * *